(12) United States Patent
Fujimura et al.

(10) Patent No.: US 12,162,764 B2
(45) Date of Patent: Dec. 10, 2024

(54) COLLOIDAL SILICA AND METHOD FOR PRODUCING SAME

(71) Applicant: FUSO CHEMICAL CO., LTD., Osaka (JP)

(72) Inventors: Yuka Fujimura, Fukuchiyama (JP); Yoshiki Michiwaki, Fukuchiyama (JP)

(73) Assignee: FUSO CHEMICAL CO., LTD., Osaka (JP)

(*) Notice: Subject to any disclaimer, the term of this patent is extended or adjusted under 35 U.S.C. 154(b) by 407 days.

(21) Appl. No.: 17/436,385

(22) PCT Filed: Feb. 26, 2020

(86) PCT No.: PCT/JP2020/007585
§ 371 (c)(1),
(2) Date: Sep. 3, 2021

(87) PCT Pub. No.: WO2020/179558
PCT Pub. Date: Sep. 10, 2020

(65) Prior Publication Data
US 2022/0144650 A1 May 12, 2022

(30) Foreign Application Priority Data
Mar. 6, 2019 (JP) .................. 2019-040723

(51) Int. Cl.
*C01B 33/145* (2006.01)
(52) U.S. Cl.
CPC ........ *C01B 33/145* (2013.01); *C01P 2004/03* (2013.01); *C01P 2006/12* (2013.01)

(58) Field of Classification Search
None
See application file for complete search history.

(56) References Cited

U.S. PATENT DOCUMENTS

| 8,529,787 | B2 | 9/2013 | Higuchi et al. |
| 2008/0086951 | A1 | 4/2008 | Wakamiya et al. |
| 2010/0071272 | A1* | 3/2010 | Higuchi ............... C09K 3/1409 51/308 |

(Continued)

FOREIGN PATENT DOCUMENTS

| CN | 102164853 B | 12/2014 |
| CN | 112875710 A | 6/2021 |

(Continued)

OTHER PUBLICATIONS

Machine Translation of JP 2007153732 (Year: 2007).*

(Continued)

*Primary Examiner* — Michael Forrest
(74) *Attorney, Agent, or Firm* — WHDA, LLP (57) ABSTRACT

The present invention provides colloidal silica containing silica particles excellent in compactness and excellent in maintenance of the bumpy surface under basic conditions, and provides a method for producing the colloidal silica. The present invention provides colloidal silica containing silica particles having a bumpy surface, wherein (1) the silica particles have a content of alkoxy groups of 1000 ppm or more, and (2) the silica particles have a reduction in specific surface area of 15.0% or less when the silica particles are heated under basic conditions.

4 Claims, 1 Drawing Sheet

(56) References Cited

U.S. PATENT DOCUMENTS

| | | | |
|---|---|---|---|
| 2011/0209413 A1 | 9/2011 | Nishida et al. | |
| 2012/0276290 A1* | 11/2012 | Zhao | C01B 33/145 |
| | | | 977/775 |
| 2018/0155591 A1 | 6/2018 | Kumazawa et al. | |

FOREIGN PATENT DOCUMENTS

| | | |
|---|---|---|
| FR | 1251638 A | 1/1961 |
| JP | 6-316407 A | 11/1994 |
| JP | 2005-015323 A | 1/2005 |
| JP | 2007-153732 A | 6/2007 |
| JP | 2011-201719 A | 10/2011 |
| JP | 2016-008157 A | 1/2016 |
| JP | 2018-90798 A | 6/2018 |
| TW | 200831407 A | 8/2008 |
| WO | 2010/052945 A1 | 5/2010 |

OTHER PUBLICATIONS

International Search Report dated Mar. 31, 2020, issued in counterpart International Application No. PCT/JP2020/007585. (2 pages).
Chinese Doctoral Dissertations & Master's Theses Full-text Database Engineering Science and Technolog No. 1, 2016, pp. 1-67, with English abstract, cited in CN Office Action dated Nov. 17, 2023. (79 pages).

* cited by examiner

COLLOIDAL SILICA AND METHOD FOR PRODUCING SAME

TECHNICAL FIELD

The present invention relates to colloidal silica and a method for producing the colloidal silica. In particular, the present invention relates to colloidal silica containing silica particles having a bumpy surface, and a method for producing the colloidal silica.

BACKGROUND ART

Colloidal silica, which is obtained by dispersing fine silica particles in a medium such as water, is used as a physical property improver in the fields of, for example, paper, textiles, and steel, and also used as an abrasive for electronic materials such as semiconductor wafers. The silica particles dispersed in colloidal silica used for these applications are required to have high purity and compactness.

To produce colloidal silica that can meet the above requirements, for example, a method for producing an aqueous silica sol by adding an alkyl silicate to a reaction medium having an alkali concentration in a specific range is disclosed (see, for example, Patent Literature (PTL) 1).

However, the production method disclosed in PTL 1 produces spherical particles, and nowhere analyzes the shape of silica particles.

Further, a method for producing a colloidal silica containing silica particles with small protrusions on the surface of the particles by using a quaternary ammonium salt etc. as a hydrolysis catalyst is disclosed (see, for example, PTL 2). Colloidal silica that contains deformed silica particles, e.g., silica particles with protrusions on the surface, is capable of achieving a higher degree of abrasiveness as an abrasive.

CITATION LIST

Patent Literature

PTL 1: JPH06-316407A
PTL 2: JP2007-153732A

SUMMARY OF INVENTION

Technical Problem

The present inventors found that the colloidal silica produced by the production method disclosed in PTL 2 has the problem that the bumpy surface cannot be maintained under basic conditions.

The present inventors conducted extensive research, thereby succeeding in producing a colloidal silica that contains silica particles excellent in maintenance of the bumpy surface even under basic conditions. The inventors then found that such colloidal silica can be suitably used as an abrasive and successfully solve the above problems. The present invention has thus been completed.

An object of the present invention is to provide a colloidal silica that contains silica particles excellent in compactness and excellent in maintenance of the bumpy surface even under basic conditions, and provide a production method that is capable of producing the colloidal silica.

Solution to Problem

The present inventors conducted extensive research to achieve the above objects, and consequently found that the above objects can be achieved by colloidal silica that contains silica particles having a bumpy surface, containing alkoxy groups in a specific amount range, and showing a reduction in specific surface area in a specific percentage range when heated under basic conditions. The present invention has thus been completed.

Specifically, the present invention relates to the following colloidal silica and method for producing the colloidal silica.

1. A colloidal silica comprising silica particles having a bumpy surface,
wherein
   (1) the silica particles have a content of alkoxy groups of 1000 ppm or more, and
   (2) the silica particles have a reduction in specific surface area of 15.0% or less when the silica particles are heated under basic conditions.
2. The colloidal silica according to Item 1, wherein the silica particles have a particle density of 1.95 or more.
3. The colloidal silica according to Item 1 or 2, wherein the silica particles contain 5 μmol or more of at least one amine selected from the group consisting of a primary amine, a secondary amine, and a tertiary amine, per gram of the silica particles, wherein the amine contains no hydroxyl group as a substituent.
4. A method for producing colloidal silica containing silica particles having a bumpy surface, the method comprising in series
   (1) step 1 of preparing a mother liquor containing an alkaline catalyst and water,
   (2) step 2 of adding an alkoxysilane to the mother liquor to prepare a seed particle dispersion, and
   (3) step 3 of adding water, an alkaline catalyst, and an alkoxysilane to the seed particle dispersion,
wherein
   the alkaline catalyst is at least one amine selected from the group consisting of a primary amine, a secondary amine, and a tertiary amine, wherein the amine contains no hydroxyl group as a substituent, and
   in step 3, the molar ratio (s3/c3) of the amount of the alkoxysilane added s3 (mol) to the amount of the alkaline catalyst added c3 (mol) is more than 185 and 400 or less.

Advantageous Effects of Invention

The colloidal silica according to the present invention contains silica particles excellent in compactness and excellent in maintenance of the bumpy surface under basic conditions. The method for producing colloidal silica according to the present invention produces such colloidal silica.

DESCRIPTION OF EMBODIMENTS

Figure 1:
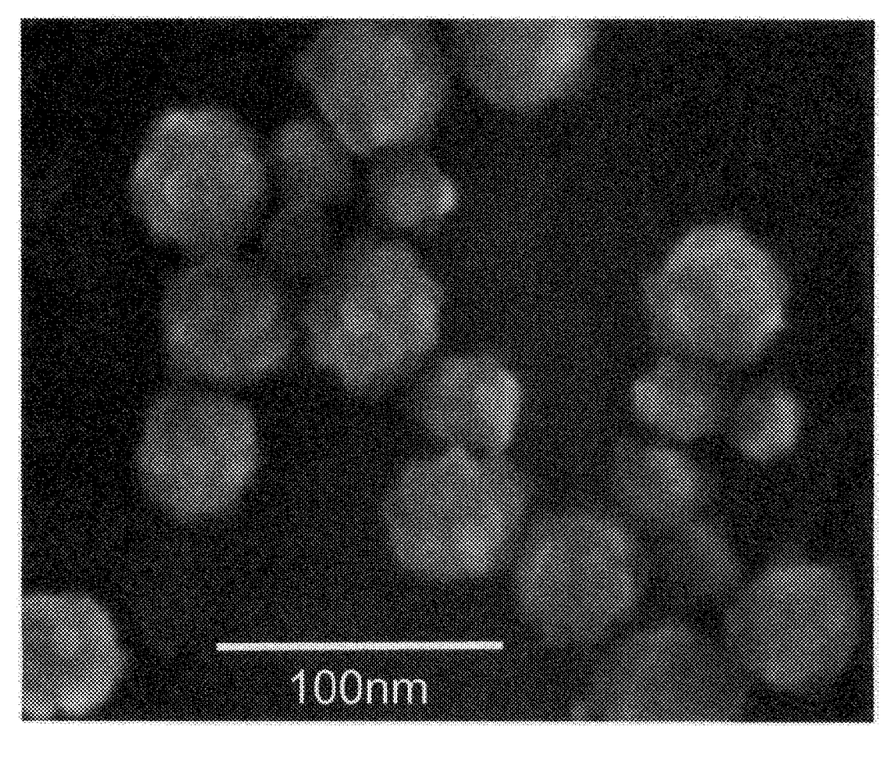
FIG. 1 is an SEM image of the silica particles of the colloidal silica produced in Example 2.

The following describes the colloidal silica and the method for producing the colloidal silica according to the present invention in detail.

Due to the silica particles having a bumpy surface, the colloidal silica according to the present invention exhibits high abrasiveness. Due to the content of alkoxy groups of 1000 ppm or more in silica particles, the colloidal silica according to the present invention contains a high amount of alkoxy groups per unit weight in silica particles and can thus reduce defects on the surface of a substrate such as a polished object. Additionally, due to the silica particles having a reduction in specific surface area of 15.0% or less when heated under basic conditions, the colloidal silica according to the present invention is excellent in maintenance of the bumpy surface under basic conditions and can maintain high abrasiveness under basic conditions. The method for producing colloidal silica according to the present invention uses at least one amine selected from the group consisting of a primary amine, a secondary amine, and a tertiary amine (wherein the amine contains no hydroxyl group as a substituent) as an alkaline catalyst, and performs sol-gel reaction with a molar ratio (s3/c3) of the amount of an alkoxysilane added s3 (mol) to the amount of an alkaline catalyst added c3(mol) in step 3 within a specific range; thus, the method for producing colloidal silica according to the present invention can produce colloidal silica with fewer metallic impurities, is excellent in maintenance of the bumpy surface under basic conditions, and is capable of maintaining high abrasiveness under basic conditions.

1. Colloidal Silica

The colloidal silica according to the present invention contains silica particles having a bumpy surface, wherein (1) the silica particles have a content of alkoxy groups of 1000 ppm or more, and (2) the silica particles have a reduction in specific surface area of 15.0% or less when the silica particles are heated under basic conditions.

In the present specification, a bumpy surface of silica particles means a shape having minute protrusions on the surface of silica particles, and means that silica particles have a shape similar to konpeito (Japanese sugar candy). The bumpy surface can be defined by a range of the surface roughness (B1/S1) determined by dividing a BET specific surface area (B1) by a specific surface area (S1) calculated from a SEM minor diameter. The specific surface area (S1) can be determined by converting the value of 2727/SEM minor diameter (nm) with a particle density of silica taken as 2.2. The surface roughness (B1/S1) is preferably 1.1 or more, and more preferably 1.4 or more. The surface roughness (B1/S1) is also preferably 2.0 or less, and more preferably 1.8 or less.

The silica particles have a content of alkoxy groups of 1000 ppm or more. A content of alkoxy groups of less than 1000 ppm reduces the abrasiveness of the colloidal silica according to the present invention, and cannot reduce defects on the surface of a polished object. The content of alkoxy groups is preferably 4000 ppm or more, and more preferably 5000 ppm or more. The content of alkoxy groups is also preferably 45000 ppm or less, and more preferably 40000 ppm or less. An upper limit of the content of alkoxy groups falling within these ranges further increases the abrasiveness of the colloidal silica according to the present invention.

The content of alkoxy groups can be measured by the following method.

Content of Alkoxy Groups (ppm)

Colloidal silica is centrifuged at 215000 G for 90 minutes, and then the supernatant is discarded. The solids are vacuum-dried at 60° C. for 90 minutes. 0.50 g of the obtained dry silica solids are weighed and added to 50 ml of a 1M aqueous sodium hydroxide solution, followed by heating at 50° C. for 24 hours with stirring to dissolve silica. The silica solution is analyzed by gas chromatography to determine the alcohol content, followed by calculating the content of alkoxy groups per gram of silica. The detector for use in gas chromatography is a flame ionization detector (FID). Analysis by gas chromatography is performed in accordance with JIS K0114.

BET Specific Surface Area (m/g)

Colloidal silica is pre-dried on a hot plate and then heated at 800° C. for 1 hour to prepare a measurement sample. The prepared measurement sample is measured by the nitrogen gas adsorption method (BET method).

Average Primary Particle Size (nm)

The average primary particle size (nm) of silica particles in the colloidal silica is calculated by using the value of 2727/BET specific surface area ($m^2$/g) from the measurement value of the BET specific surface area, regarding the density of silica particles as 2.2.

The silica particles have a reduction in specific surface area of 15.0% or less when the silica particles are heated under basic conditions. A reduction in specific surface area exceeding 15.0% reduces the level of base resistance of protrusions and the maintenance of the bumpy surface of silica particles under basic conditions, thus leading to a failure to maintain abrasiveness under basic conditions. The reduction in specific surface area is preferably 14.5% or less, and more preferably 14.3% or less. The lower limit of the reduction in specific surface area may be, although not particularly limited to, about 0.1%.

The reduction in specific surface area can be measured by the following measurement method.

Reduction in Specific Surface Area

3-Ethoxypropylamine is added to 800 g of colloidal silica to adjust the pH to 9.9 to 10.3. The colloidal silica is placed in a flask equipped with a reflux tube and heated, followed by base treatment for 3 hours while the reflux state is maintained. The pH of the colloidal silica that has been subjected to base treatment is adjusted to 7.6 to 7.8, and the BET specific surface area is measured in accordance with the measurement method for BET specific surface area described above. The reduction in specific surface area is determined by the following formula from the BET specific surface area before and after base treatment.

Reduction in specific surface area (%)=(BET specific surface area before base treatment−BET specific surface area after base treatment)/BET specific surface area before base treatment×100

The silica particles preferably have a particle density of 1.95 or more. A particle density of 1.95 or more further increases the hardness of silica particles and further increases the abrasiveness of colloidal silica. The silica particles have a particle density of more preferably 2.00 or more, and still more preferably 2.10 or more. The particle density is also preferably 2.20 or less, and more preferably 2.16 or less.

The particle density of silica particles can be measured by drying and hardening colloidal silica at 150° C. on a hot plate, keeping the colloidal silica in a furnace at 300° C. for 1 hour, and then measuring its particle density by a liquid-phase displacement method using ethanol.

The silica particles preferably contain at least one amine selected from the group consisting of a primary amine, a secondary amine, and a tertiary amine. The amine can be any amine, and is represented by the following formula (X).

$$NR_aR_bR_c \quad (X)$$

wherein $R_a$, $R_b$, and $R_c$ each represent an optionally substituted $C_{1-12}$ alkyl group or hydrogen; however, ammonia, in which $R_a$, $R_b$, and $R_c$ are all hydrogen, is excluded.

$R_a$, $R_b$, and $R_c$ may be the same or different. $R_a$, $R_b$, and $R_c$ may be linear, branched, or cyclic.

The number of carbon atoms of a linear or branched alkyl group may be 1 to 12, preferably 1 to 8, and more preferably 1 to 6. Examples of linear alkyl groups include a methyl group, an ethyl group, a propyl group, a butyl group, a pentyl group, a hexyl group, a heptyl group, and an octyl group. Examples of branched alkyl groups include an isopropyl group, a 1-methylbutyl group, a 2-methylbutyl group, a 3-methylbutyl group, a 1,1-dimethylpropyl group, a 1,2-dimethylpropyl group, a 2,2-dimethylpropyl group, a 1-methylpentyl group, a 2-methylpentyl group, a 3-methylpentyl group, a 4-methylpentyl group, a 1,1-dimethylbutyl group, a 1,2-dimethylbutyl group, a 1,3-dimethylbutyl group, a 2,2-dimethylbutyl group, a 2,3-dimethylbutyl group, a 1-methyl-1-ethylpropyl group, a 2-methyl-2-ethylpropyl group, a 1-ethylbutyl group, a 2-ethylbutyl group, a 1-ethylhexyl group, a 2-ethylhexyl group, a 3-ethylhexyl group, a 4-ethylhexyl group, and a 5-ethylhexyl group. Preferable linear or branched alkyl groups include an n-propyl group, an n-hexyl group, a 2-ethylhexyl group, and an n-octyl group.

The number of carbon atoms of a cyclic alkyl group may be, for example, 3 to 12, and preferably 3 to 6. Examples of cyclic alkyl groups include a cyclopropyl group, a cyclobutyl group, a cyclopentyl group, a cyclohexyl group, a cycloheptyl group, and a cyclooctyl group. Preferable cyclic alkyl groups include a cyclohexyl group.

The alkyl groups represented by $R_a$, $R_b$, and $R_c$ in formula (X) are optionally substituted. The number of substituents may be, for example, 0, 1, 2, 3, or 4, preferably 0, 1, or 2, more preferably 0 or 1. An alkyl group with 0 substituents means an unsubstituted alkyl group. Examples of substituents include a $C_{1-3}$ alkoxy group (e.g., a methoxy group, an ethoxy group, a propoxy group, and an isopropoxy group), an amino group, a primary amino group substituted with a $C_{1-4}$ linear alkyl group, an amino group di-substituted with a $C_{1-4}$ linear alkyl group (e.g., a dimethylamino group and a di-n-butylamino group), and an unsubstituted amino group. However, the hydroxyl group is excluded from the substituents. In alkyl groups having multiple substituents, the substituents may be the same or different.

$R_a$, $R_b$, and $R_c$ in formula (X) may be an optionally substituted $C_{1-8}$ (preferably $C_{1-6}$) linear or branched alkyl group. $R_a$, $R_b$, and $R_c$ may be a $C_{1-8}$ (preferably $C_{1-6}$) linear or branched alkyl group optionally substituted with a $C_{1-3}$ alkoxy group.

$R_a$, $R_b$, and $R_c$ may be unsubstituted. Preferably, $R_a$, $R_b$, and $R_c$ are an unsubstituted linear or branched $C_{1-12}$ alkyl group, or a linear or branched $C_{1-12}$ alkyl group substituted with an alkoxy group.

The amine described above may be, for example, at least one amine selected from the group consisting of aliphatic ether amines, such as 3-ethoxypropylamine, 2-methoxyethylamine, 2-2-ethoxyethylamine, 3-methoxypropylamine, 3-propoxypropylamine, 3-isopropoxypropylamine, 3-butoxypropylamine, 3-isobutoxypropylamine, 3-(2-ethylhexyloxy)propylamine, and 3-(2-methoxyethoxy)propylamine; and aliphatic amines, such as pentylamine, hexylamine, dipropylamine, and triethylamine. Of these, from the standpoint of further increasing the content of silica particles excellent in maintenance of the bumpy surface under basic conditions, aliphatic ether amines are preferable, and 3-ethoxypropylamine is more preferable.

The amines may be used singly, or in a combination of two or more.

The content of at least one amine selected from the group consisting of a primary amine, a secondary amine, and a tertiary amine (wherein the amine contains no hydroxyl group as substituent) in silica particles is preferably 5 μmol or more, and more preferably 10 μmol or more, per gram of silica particles. A lower limit of the content of the amine falling within these ranges further increases the content of silica particles excellent in maintenance of the bumpy surface under basic conditions in colloidal silica, enabling colloidal silica to exhibit even more sufficient abrasiveness. The content of the amine is preferably 100 μmol or less, and more preferably 90 μmol or less, per gram of silica particles. An upper limit of the content of the amine falling within these ranges makes it even easier for silica particles having a bumpy surface to form.

The content of the amine can be measured by the following method. Specifically, colloidal silica is centrifuged at 215000 G for 90 minutes, and then the supernatant is discarded. The solids are vacuum-dried at 60° C. for 90 minutes. 0.50 g of the obtained dry silica solids are weighed and added to 50 ml of a 1M aqueous sodium hydroxide solution, followed by heating at 50° C. for 24 hours with stirring to dissolve silica. The silica solution is analyzed by ion chromatography to determine the amine content. Analysis by ion chromatography is performed in accordance with JIS K0127.

The boiling point of the amine is preferably 85° C. or more, and more preferably 90° C. or more. A lower limit of the boiling point falling within these ranges further suppresses vaporization during the reaction and enables the amine to be suitably used as a catalyst. The boiling point of the amine is also preferably 500° C. or less, and more preferably 300° C. or less.

The colloidal silica according to the present invention contain silica particles having a bumpy surface in an amount of preferably 20% or more, and more preferably 30% or more of the number of particles in a given field of view as observed with a scanning electron microscope at 200,000-times magnification. A lower limit of the content of silica particles falling within these ranges further increases the abrasiveness of colloidal silica. The upper limit of the content may be, although not particularly limited to, 100% or 70%.

In the present specification, the content of silica particles having a bumpy surface can be measured by the following measurement method. Specifically, the number of particles having a bumpy surface out of the particles in a given field of view as observed with a scanning electron microscope (SEM) at 200,000-times magnification is counted, and the percentage of the particles is determined to be the content (%).

The SEM minor diameter of the silica particles in colloidal silica is preferably 8 nm or more, and more preferably nm or more. A lower limit of the SEM minor diameter of silica particles falling within these ranges further increases the abrasiveness of colloidal silica according to the present invention. The SEM minor diameter of the silica particles is also preferably 100 nm or less, and more preferably 80 nm or less. An upper limit of the SEM minor diameter of silica particles falling within these ranges further suppresses the formation of scratches on a polished object.

The SEM minor diameter can be measured by the following method. Images of 1000 silica particles captured by a scanning electron microscope were each subjected to elliptic approximation with image analysis software (WinRoof2015, produced by Mitani Corporation) to measure their elliptical minor axis. The number frequency distribution of the elliptical minor axes was obtained, and the elliptical minor axis with a number frequency of 50% was defined as the SEM minor diameter (nm).

The silica particles in colloidal silica have an average secondary particle size of preferably 8 nm or more, and more preferably 15 nm or more. A lower limit of the average secondary particle size of silica particles falling within these ranges further increases the abrasiveness of the colloidal silica according to the present invention. The silica particles also have an average secondary particle size of preferably 400 nm or less, and more preferably 300 nm or less. An upper limit of the average secondary particle size of silica particles falling within these ranges further suppresses the formation of scratches on a polished object.

In the present specification, the average secondary particle size of silica particles in colloidal silica can be measured by the following measurement method. Specifically, colloidal silica is added to a 0.3 wt % citric acid aqueous solution and homogenized to prepare a dynamic-light-scattering measurement sample. The secondary particle size of the measurement sample is measured by dynamic light scattering (ELSZ-2000S, produced by Otsuka Electronics Co., Ltd.).

The silica particles in colloidal silica have an aspect ratio of preferably 1.0 or more, and more preferably 1.1 or more. A lower limit of the aspect ratio falling within these ranges further increases abrasiveness. The silica particles also have an aspect ratio of preferably 4.0 or less, and more preferably 3.0 or less. An upper limit of the aspect ratio falling within these ranges further suppresses the formation of scratches on a polished object.

In the present specification, the aspect ratio of the silica particles in colloidal silica can be measured by the following measurement method. Specifically, images of 1000 silica particles captured with a scanning electron microscope are each subjected to elliptic approximation with image analysis software (WinRoof2015, produced by Mitani Corporation) to measure the elliptical major axis and elliptical minor axis of each particle. The ratio of the elliptical major axis to the elliptical minor axis (elliptical major axis/elliptical minor axis) of each particle is calculated, and the average is determined to be the aspect ratio.

The colloidal silica according to the present invention contains metallic impurities, such as sodium, potassium, iron, aluminum, calcium, magnesium, titanium, nickel, chromium, copper, zinc, lead, silver, manganese, and cobalt, preferably in an amount of 1 ppm or less. Due to the content of metallic impurities of 1 ppm or less, the colloidal silica according to the present invention can be suitably used in polishing electronic materials and other like materials.

In the present specification, the content of metallic impurities refers to a value measured with an atomic absorption spectrometer.

The silica particles in colloidal silica have an aggregation ratio of preferably 1.5 or more, and more preferably 1.7 or more. A lower limit of the aggregation ratio of silica particles falling within these ranges further increases the abrasiveness of the colloidal silica according to the present invention. The silica particles also have an aggregation ratio of preferably 5.5 or less, and more preferably 5.0 or less. An upper limit of the aggregation ratio of silica particles falling within these ranges further suppresses the formation of scratches on a polished object.

In the present specification, the aggregation ratio of the silica particles in colloidal silica is a value determined by dividing the average secondary particle size by the average primary particle size of the silica particles in colloidal silica.

The density of silanol groups of silica particles in colloidal silica is preferably 1.5 groups/nm$^2$ or more, and more preferably 1.6 groups/nm$^2$ or more. A lower limit of the density of silanol groups falling within these ranges further suppresses the formation of scratches on a polished object. The density of silanol groups of silica particles is also preferably 5.0 groups/nm$^2$ or less, and more preferably 4.0 groups/nm$^2$ or less. An upper limit of the density of silanol groups falling within these ranges further increases the abrasiveness of the colloidal silica according to the present invention.

The density of silanol groups of silica particles in colloidal silica can be determined by the Sears method. The Sears method was performed with reference to the following: G. W. Sears, Jr., "Determination of Specific Surface Area of Colloidal Silica by Titration with Sodium Hydroxide," Analytical Chemistry, 28 (12), 1981 (1956). The measurement was performed by titration with a 0.1 mol/L aqueous sodium hydroxide solution by using a 1 wt % silica dispersion and calculating the density of silanol groups in accordance with the following formula.

$$\rho = (a \times f \times 6022)/(c \times S)$$

In the formula, ρ represents the density of silanol groups (the number of silanol groups/nm$^2$), a represents the amount of droplets of a 0.1 mol/L aqueous sodium hydroxide solution with a pH of 4 to 9 (mL), f represents the factor of the 0.1 mol/L aqueous sodium hydroxide solution, c represents the mass of silica particles (g), and S represents the BET specific surface area (m$^2$/g)

2. Method for Producing Colloidal Silica

The method for producing colloidal silica according to the present invention, which is a method for producing colloidal silica containing silica particles having a bumpy surface, includes in series (1) step 1 of preparing a mother liquor containing an alkaline catalyst and water, (2) step 2 of adding an alkoxysilane to the mother liquor to prepare a seed particle dispersion, and (3) step 3 of adding water, an alkaline catalyst, and an alkoxysilane to the seed particle dispersion, wherein the alkaline catalyst is at least one amine selected from the group consisting of a primary amine, a secondary amine, and a tertiary amine wherein the amine contains no hydroxyl group as a substituent, and in step 3, the molar ratio (s3/c3) of the amount of the alkoxysilane added s3 (mol) to the amount of the alkaline catalyst added c3 (mol) is more than 185 and 400 or less.

Step 1

Step 1 is preparing a mother liquor containing an alkaline catalyst and water.

(Step 1)

The alkaline catalyst is at least one amine selected from the group consisting of a primary amine, a secondary amine, and a tertiary amine wherein the amine contains no hydroxyl group as a substituent. The amine for use can be those explained in the Colloidal Silica section above.

The content of the amine in the mother liquor is preferably 0.30 mmol/kg or more, and more preferably 0.50 mmol/kg or more. A lower limit of the content of the amine falling within these ranges makes it easier to control the particle size. The content of the amine in the mother liquor is preferably 20.0 mmol/kg or less, and more preferably 15.0 mmol/kg or less. A content of the amine falling within these ranges makes it unlikely for gelation to occur during the reaction.

The method for preparing the mother liquor can be any method. The mother liquor can be prepared by adding an alkaline catalyst to water and stirring the mixture by a known method.

The pH of the mother liquor is, although not particularly limited to, preferably 9.5 or more, and more preferably 10.0 or more. A lower limit of the pH of the mother liquor falling within these ranges makes it even easier to control the particle size. The pH of the mother liquor is preferably 12.0 or less, and more preferably 11.5 or less. An upper limit of the pH of the mother liquor falling within these ranges makes it even easier to control the average secondary particle size of silica particles having a bumpy surface and suppresses the aggregation of seed particles in the seed particle dispersion obtained in step 2, described below, thereby further increasing the storage stability of colloidal silica.

Step 2

Step 2 is adding an alkoxysilane to the mother liquor to prepare a seed particle dispersion.

The alkoxysilane is not particularly limited, and includes an alkoxysilane represented by the following formula (2)

$$Si(OR^1)_4 \qquad (2)$$

wherein $R^1$ represents an alkyl group.

In formula (2), $R^1$ represents an alkyl group. $R^1$ can be any alkyl group, and is preferably a $C_{1-8}$ lower alkyl group, and more preferably a $C_{1-4}$ lower alkyl group. Specific examples of alkyl groups include a methyl group, an ethyl group, a propyl group, an isopropyl group, a butyl group, a pentyl group, and a hexyl group. The alkoxysilane represented by formula (2) is preferably tetramethoxysilane wherein $R^1$ is a methyl group (tetramethyl orthosilicate), tetraethoxysilane wherein $R^1$ is an ethyl group (tetraethyl orthosilicate), or tetraisopropoxysilane wherein $R^1$ is an isopropyl group; more preferably tetramethoxysilane wherein $R^1$ is a methyl group, or tetraethoxysilane wherein $R^1$ is an ethyl group; and still more preferably tetramethoxysilane.

The alkoxysilane represented by formula (2) may be a derivative. Examples of derivatives of the alkoxysilane include low condensates obtained by partially hydrolyzing the alkoxysilane represented by formula (2).

The alkoxysilane represented by formula (2) may be used singly, or in a combination of two or more.

The amount of the alkoxysilane represented by formula (2) in the seed particle dispersion is not particularly limited. The molar ratio (s2/c1) of the amount of the alkoxysilane added s2 (mol) in step 2 to the amount of the alkaline catalyst c1 (mol) in the mother liquor is preferably 10 or more, more preferably 100 or more, and still more preferably 150 or more. A lower limit of the molar ratio s2/c1 falling within these ranges can further increase the content of the silica particles in colloidal silica. The molar ratio s2/c1 is also preferably 8500 or less, and more preferably 8000 or less. An upper limit of the molar ratio s2/c1 falling within these ranges makes it unlikely for gelation to occur during the reaction.

The time period for adding an alkoxysilane in step 2 is preferably 5 minutes or more, and more preferably 10 minutes or more. A lower limit of the time period for addition falling within these ranges makes it unlikely for gelation to occur during the reaction. The time period for adding an alkoxysilane is preferably 1000 minutes or less, and more preferably 600 minutes or less. An upper limit of the time period for addition falling within these ranges further increases productivity and further reduces production costs.

The pH of the seed particle dispersion is preferably 8.5 or less, and more preferably 8.0 or less. An upper limit of the pH of the seed particle dispersion falling within these ranges makes it even easier to form silica particles having a bumpy surface. The pH of the seed particle dispersion is also preferably 4.5 or more, and more preferably 4.9 or more. A lower limit of the pH of the seed particle dispersion falling within these ranges further suppresses gelation.

The temperature of the seed particle dispersion in step 2 is preferably 70° C. or more, and more preferably 75° C. or more. A lower limit of the temperature of the seed particle dispersion falling within these ranges further suppresses gelation during the reaction. The temperature of the seed particle dispersion is also preferably 95° C. or less, and more preferably 90° C. or less. An upper limit of the temperature of the seed particle dispersion falling within these ranges further suppresses the vaporization of the alkoxysilane.

Step 3

Step 3 is adding water, an alkaline catalyst, and an alkoxysilane to the seed particle dispersion.

The alkaline catalyst is at least one amine selected from the group consisting of a primary amine, a secondary amine, and a tertiary amine wherein the amine contains no hydroxyl group as a substituent. The amine for use can be those explained in the Colloidal Silica section above. The alkaline catalyst for use in step 3 may be the same as or different from the alkaline catalyst used in step 1.

Step 3 forms silica particles having a bumpy surface in colloidal silica. Although the action mechanism is not clear, it is speculated as follows. Specifically, the addition of an alkoxysilane in step 3 decreases the pH of the seed particle dispersion. In the reaction forming silica particles in step 3, seed particles are not newly generated under basic and relatively high pH conditions, and the alkoxysilane is consumed, so silica particles simply grow, presumably hampering the formation of silica particles having a bumpy surface. However, when the seed particle dispersion becomes weakly basic with a gradual decrease in pH, the condensation rate of the hydrolysate of the alkoxysilane increases, and the embryos, which are the precursor of seed particles, do not dissolve, thereby allowing seed particles to newly form. Additionally, when the pH falls to a near-neutral condition, the seed particles generated under weak basic conditions combine with the original seed particles generated in step 2 to make the particle surface bumpy. Thus, the production method according to the present invention is considered to be capable of producing colloidal silica having a bumpy surface.

Given the above speculated action mechanism, it is preferred that the pH of the seed particle dispersion in step 3 be decreased while being controlled to an appropriate pH from strongly basic to near neutral. Thus, alkaline catalysts that maintain a high pH or alkaline catalysts that abruptly decrease the pH are not suitable as the alkaline catalyst for use in step 3. An alkaline catalyst that has a gradually decreasing buffering capacity while controlling the pH within an appropriate range is preferable for use.

Given the above action mechanism, because pKa, which represents the physical properties of an acid or base, is the central value of the buffering region, pKa can be a criterion to determine whether a substance has a gradually decreasing buffering capacity while controlling the pH within an appropriate range in step 3. Specifically, the alkaline catalyst for use in step 3 is preferably an amine represented by formula (X) having a pKa value of 8.5 or more and less than 11, and more preferably an amine represented by formula (X) having a pKa value of 9 or more and less than 10.

The amine represented by formula (X) and its pKa value are as follows. In aliphatic ether amines, 3-ethoxypropylamine (9.79), 2-methoxyethylamine (9.89), 3-methoxypropylamine (9.73), 3-propoxypropylamine (9.78), 3-isopropoxypropylamine (9.82), and 3-butoxypropylamine (9.77). In aliphatic amines, pentylamine (10.63), hexylamine (10.56), dipropylamine (10.91), and triethylamine (10.75).

The alkoxysilane for use in step 3 is not particularly limited, and can be the alkoxysilanes explained in step 2. The alkoxysilane for use in step 3 may be the same as or different from the alkoxysilane used in step 2, and is preferably the same alkoxysilane as that used in step 2.

The molar ratio (s3/c3) of the amount of the alkoxysilane added s3 (mol) to the amount of the alkaline catalyst added c3 (mol) in step 3 exceeds 185. A lower limit of the molar ratio s3/c3 exceeding 185 further makes it easier to make the surface bumpy. The molar ratio s3/c3 is preferably 200 or more, and more preferably 220 or more. The molar ratio s3/c3 is also 400 or less. A molar ratio s3/c3 of 400 or less further suppresses the gelation of colloidal silica. The molar ratio s3/c3 is preferably 380 or less, and more preferably 350 or less.

In step 3, alcohol, in addition to the water, alkaline catalyst, and alkoxysilane, may be added to the seed particle dispersion.

The alcohol can be any water-soluble alcohol. The alcohol for use is preferably the same alcohol generated as a by-product in the hydrolysis of the alkoxysilane used. For example, when the alkoxysilane is tetramethyl orthosilicate, methanol is preferably used. When the alkoxysilane is tetraethyl orthosilicate, ethanol is preferably used.

In step 3, the alcohol content is preferably 25 mass % or less, and more preferably 20 mass % or less based on the mixed liquid containing the seed particle dispersion, water, alkaline catalyst, and alcohol taken as 100 mass %. An upper limit of the alcohol content falling within these ranges makes it even easier to increase the temperature of the mixed liquid in step 3. The lower limit of the alcohol content may be, although not particularly limited to, 0 mass % or 2 mass %.

The amount of the alkoxysilane added in step 3 is not particularly limited, and the molar ratio (s3/sp3) of the amount of the alkoxysilane added s3 (mol) in step 3 to the amount of the seed particles sp3 (mol) in the mixed liquid containing the seed particle dispersion, water, alkaline catalyst, and alcohol is preferably 0 or more and 30 or less. An upper limit of the molar ratio s3/sp3 falling within this range makes it unlikely for nuclear particles to newly form during the reaction, thus further facilitating the growth of the main particles. The molar ratio is based on the molecular weight of the seed particles defined as 60.08 g/mol.

The temperature of the mixed liquid in step 3 is preferably 70° C. or more, and more preferably 75° C. or more. A lower limit of the temperature of the mixed liquid falling within these ranges further suppresses gelation during the reaction. The temperature of the mixed liquid is also preferably 95° C. or less, and more preferably 90° C. or less. An upper limit of the temperature of the mixed liquid falling within these ranges further suppresses the vaporization of the alkoxysilane.

The time period for adding an alkoxysilane in step 3 is preferably 5 minutes or more, and more preferably 10 minutes or more. A lower limit of the time period for addition falling within these ranges makes it unlikely for gelation to occur during the reaction. The time period for adding an alkoxysilane is also preferably 1000 minutes or less, and more preferably 600 minutes or less. An upper limit of the time period for addition falling within these ranges further increases productivity, and further reduces production costs.

The production method described above enables the production of the colloidal silica according to the present invention.

The pH of the colloidal silica is preferably 11.0 or less, and more preferably 10.0 or less. An upper limit of the pH of the colloidal silica falling within these ranges further suppresses the dissolution of silica particles. The pH of the colloidal silica is also preferably 5.8 or more, and more preferably 6.0 or more. A lower limit of the pH of the colloidal silica falling within these ranges further suppresses gelation.

The method for producing colloidal silica according to the present invention may further include, after step 3, the step of concentrating the colloidal silica. The concentration method is not particularly limited, and the colloidal silica may be concentrated by a known method. Examples of concentration methods include heat concentration at about 65 to 100° C.

The concentration of silica particles in concentrated colloidal silica is, although not particularly limited to, preferably about 1 to 50 mass % based on the colloidal silica taken as 100 mass %.

The method for producing colloidal silica according to the present invention may further include, after step 3, the step of distilling out of the system the methanol formed as a by-product during the reaction. The method for distilling methanol out of the system is not particularly limited. An example of such methods is replacing the dispersion medium with pure water by adding pure water dropwise while heating the colloidal silica to maintain the volume at a constant level. Examples of other methods include a method of separating colloidal silica from the solvent by precipitation, separation, centrifugation, etc., and re-dispersing the separated silica in water.

The colloidal silica according to the present invention and the colloidal silica produced by the production method according to the present invention have a variety of applications such as abrasives and paper coating agents. An abrasive containing the colloidal silica is also encompassed in the scope of the present invention. Because the colloidal silica according to the present invention can be highly pure with a content of metallic impurities (e.g., sodium) of 1 ppm or less, the colloidal silica is suitable for use, in particular, in abrasives for chemical mechanical polishing of semiconductor wafers.

EXAMPLES

The present invention will be described in detail below with reference to Examples. However, the present invention is not limited to the Examples.

Example 1

Step 1: 6767 g of pure water as a solvent and 6.98 g of 3-ethoxypropylamine (3-EOPA) as an alkaline catalyst were placed in a flask to prepare a mother liquor. The pH of the mother liquor was 11.0.

Step 2: The mother liquor was heated to an internal temperature of 80° C., and 2472 g of tetramethyl orthosilicate was added dropwise to the mother liquor at a constant rate over a period of 210 minutes, while the temperature was adjusted to maintain the internal temperature, to prepare a seed particle dispersion.

Step 3: 5704 g of pure water as a solvent, 6.50 g of 3-ethoxypropylamine (3-EOPA) as an alkaline catalyst, and 1075 g of the seed particle dispersion prepared in step 2 were placed in a flask. Thereafter, the mixture was heated to an internal temperature of 80° C., and 2397 g of tetramethyl orthosilicate was added thereto dropwise at a constant rate over a period of 180 minutes while the temperature was adjusted to maintain the internal temperature. After completion of the dropwise addition, stirring was maintained for 15 minutes to prepare a colloidal silica dispersion. The colloidal silica dispersion was then collected (the base amount: 800 mL) under ordinary pressure, and heated and concentrated so that the silica concentration was 20 wt %. Subsequently, while keeping the volume constant, the dispersion medium was replaced with 500 mL of pure water to distill off methanol obtained as a by-product during the reaction, whereby colloidal silica was prepared.

In Example 1, the molar ratio (s3/c3) of the amount of alkoxysilane (tetramethyl orthosilicate) added s3 (mol) in step 3 to the amount of alkaline catalyst (3-ethoxypropylamine) added c3 (mol) in step 3 was 250.

Example 2

Step 1: 6767 g of pure water as a solvent and 10.47 g of 3-ethoxypropylamine (3-EOPA) as an alkaline catalyst were placed in a flask to prepare a mother liquor. The pH of the mother liquor was 11.3.

Step 2: The mother liquor was heated to an internal temperature of 85° C., and 2472 g of tetramethyl orthosilicate was added dropwise to the mother liquor at a constant rate over a period of 210 minutes, while the temperature was adjusted to maintain the internal temperature, to prepare a seed particle dispersion.

Step 3: 5704 g of pure water as a solvent, 6.50 g of 3-ethoxypropylamine (3-EOPA) as an alkaline catalyst, 242 g of methanol, and 667 g of the seed particle dispersion prepared in step 2 were placed in a flask. Thereafter, the mixture was heated to an internal temperature of 80° C., and 2397 g of tetramethyl orthosilicate was added thereto dropwise at a constant rate over a period of 180 minutes while the temperature was adjusted to maintain the internal temperature. After completion of the dropwise addition, stirring was maintained for 15 minutes to prepare a colloidal silica dispersion. The colloidal silica dispersion was the collected (the base amount: 9000 mL) under ordinary pressure, and heated and concentrated so that the silica concentration was 20 wt %. Subsequently, while keeping the volume constant, the dispersion medium was replaced with 5680 mL of pure water to distill off methanol obtained as a by-product during the reaction, whereby colloidal silica was prepared.

In Example 2, the molar ratio (s3/c3) of the amount of alkoxysilane (tetramethyl orthosilicate) added s3 (mol) in step 3 to the amount of alkaline catalyst (3-ethoxypropylamine) added c3 (mol) in step 3 was 250.

Comparative Example 1

Step 1: 7500 g of pure water as a solvent and 1.35 g of 3-ethoxypropylamine (3-EOPA) as an alkaline catalyst were placed in a flask to prepare a mother liquor. The pH of the mother liquor was 10.3.

Step 2: The mother liquor was heated to an internal temperature of 85° C., and 2740 g of tetramethyl orthosilicate was added dropwise to the mother liquor at a constant rate over a period of 60 minutes while the temperature was adjusted to maintain the internal temperature. The mixture was stirred for 15 minutes to prepare a seed particle dispersion.

Step 3: 50 g of 3-ethoxypropylamine (3-EOPA) as an alkaline catalyst was added to the seed particle dispersion to prepare a mixed liquid. Separately, 5379 g of pure water as a solvent was placed in a flask, and 2382 g of the above mixed liquid of 3-ethoxypropylamine and the seed particle dispersion was added. Thereafter, the resulting mixture was heated to an internal temperature of 80° C., and 1712.5 g of tetramethyl orthosilicate was added thereto dropwise at a constant rate over a period of 180 minutes while the temperature was adjusted to maintain the internal temperature. After completion of the dropwise addition, stirring was maintained for 15 minutes to prepare a colloidal silica dispersion. The colloidal silica dispersion was then collected (the base amount: 800 mL) under ordinary pressure, and heated and concentrated so that the silica concentration was 20 wt %. Subsequently, while keeping the volume constant, the dispersion medium was replaced with 500 mL of pure water to distill off methanol obtained as a by-product during the reaction, whereby colloidal silica was prepared. The bumpy surface was not formed on the obtained particles.

In Comparative Example 1, the molar ratio (s3/c3) of the amount of alkoxysilane (tetramethyl orthosilicate) added s3 (mol) in step 3 to the amount of alkaline catalyst (3-ethoxypropylamine) added c3 (mol) in step 3 was 100.

Comparative Example 2

Step 1: 9492 g of pure water as a solvent and 3.28 g of triethanolamine (TEA) as an alkaline catalyst were placed in a flask to prepare a mother liquor. The pH of the mother liquor was 9.4.

Step 2: The mother liquor was heated to an internal temperature of 80° C., and 1704 g of tetramethyl orthosilicate was added dropwise to the mother liquor at a constant rate over a period of 180 minutes while the temperature was adjusted to maintain the internal temperature. After completion of the addition of tetramethyl silicate to the reaction vessel, the reaction liquid in the reaction vessel was heated, and while methanol was distilled off from an outlet tube equipped with a condenser, the reaction liquid was concentrated while feeding a reaction liquid prepared under the same conditions into the reaction vessel, to thus prepare a seed particle dispersion with a silica concentration of 12.2 wt %.

Step 3: 5582 g of pure water as a solvent, 9.43 g of triethanolamine (TEA) as an alkaline catalyst, and 857 g of the seed particle dispersion prepared in step 2 were placed in a flask. Thereafter, the mixture was heated to an internal temperature of 80° C., and 3878 g of tetramethyl orthosilicate was added dropwise at a constant rate over a period of 180 minutes while the temperature was adjusted to maintain the internal temperature. After completion of the dropwise addition, stirring was maintained for 15 minutes to prepare a colloidal silica dispersion. The colloidal silica dispersion was then collected (the base amount: 4500 mL) under ordinary pressure, and heated and concentrated so that the silica concentration was 20 wt %. Subsequently, while keeping the volume constant, the dispersion medium was replaced with 5680 mL of pure water to distill off methanol obtained as a by-product during the reaction, whereby colloidal silica was prepared.

In Comparative Example 2, the molar ratio (s3/c3) of the amount of alkoxysilane (tetramethyl orthosilicate) added s3 (mol) in step 3 to the amount of alkaline catalyst (triethanolamine) added c3 (mol) in step 3 was 403.

The characteristics of the colloidal silica of the Examples and Comparative Examples obtained as described above were evaluated according the following methods.

Content of Alkoxy Groups (ppm)

Colloidal silica was centrifuged at 215000 G for 90 minutes, and the supernatant was discarded. The solids were vacuum-dried at 60° C. for 90 minutes. 0.50 g of the obtained dry silica solids were weighed and added to 50 ml of a 1M aqueous sodium hydroxide solution, followed by heating at 50° C. for 24 hours with stirring to dissolve silica. The silica solution was analyzed by gas chromatography to determine the alcohol content, which was defined as the amount of alkoxy groups. The detector for use in gas chromatography was a flame ionization detector (FID). Gas chromatography analysis was performed in accordance with JIS K0114.

BET Specific Surface Area ($m^2/g$)

Colloidal silica was pre-dried on a hot plate and then heated at 800° C. for 1 hour to prepare a measurement sample. The prepared measurement sample was used to measure the BET specific surface area according to the following nitrogen gas adsorption method (BET method).

Nitrogen Gas Adsorption Method

Pretreatment device: BELPREP-vac II (produced by MicrotracBEL Corp.).

Pretreatment method: Vacuum-degassing was performed at 120° C. for 8 hours.

Measurement device: BELSORP-mini II (produced by MicrotracBEL Corp.).

Measurement method: The adsorption isotherms of nitrogen were measured using a constant volume method.

Measurement conditions: adsorption temperature: 77 K; adsorbent: nitrogen; saturation vapor pressure: actual measurement; adsorbent cross section: 0.162 $nm^2$; equilibrium waiting time (waiting time after reaching the adsorption equilibrium state (state in which the pressure change during adsorption/desorption was equal to or less than a specified value)): 500 sec Based on the measurement results, the specific surface area was calculated by using the BET method.

Average Primary Particle Size (nm)

The average primary particle size (nm) of silica particles in the colloidal silica was calculated by using the value of 2727/BET specific surface area ($m^2/g$) from the measurement value of the BET specific surface area, regarding the density of silica particles as 2.2.

Average Secondary Particle Size

Colloidal silica was added to a 0.3 wt % citric acid aqueous solution and homogenized to prepare a dynamic-light-scattering measurement sample. The secondary particle size of the measurement sample was measured by dynamic light scattering (ELSZ-2000S, produced by Otsuka Electronics Co., Ltd.).

Reduction in Specific Surface Area

3-Ethoxypropylamine was added to 800 g of colloidal silica to adjust the pH to 9.9 to 10.3. The colloidal silica was placed in a flask equipped with a reflux tube and heated, followed by base treatment for 3 hours while the reflux state was maintained. The pH of the colloidal silica that had been subjected to base treatment was adjusted to 7.6 to 7.8, and the BET specific surface area was measured in accordance with the measurement method for BET specific surface area described above. The reduction in specific surface area was determined by the following formula from the BET specific surface area before and after base treatment.

Reduction in specific surface area (%)=(BET specific surface area before base treatment−BET specific surface area after base treatment)/BET specific surface area before base treatment×100

SEM Minor Diameter

Images of 1000 silica particles captured by a scanning electron microscope were each subjected to elliptic approximation with image analysis software (WinRoof2015, produced by Mitani Corporation) to measure their elliptical minor axis. The number frequency distribution of the elliptical minor axes was obtained, and the elliptical minor axis with a number frequency of 50% was defined as the SEM minor diameter (nm).

Aspect Ratio

Images of 1000 silica particles captured with a scanning electron microscope were each subjected to elliptic approximation with image analysis software (WinRoof2015, produced by Mitani Corporation) to measure the elliptical major axis and elliptical minor axis of each particle. The ratio of the elliptical major axis to the elliptical minor axis (elliptical major axis/elliptical minor axis) of each particle was calculated, and the average was determined to be the aspect ratio.

Surface Roughness

The surface roughness (B1)/(S1) was determined by dividing a BET specific surface area (B1) by a specific surface area (S1) calculated from the SEM minor diameter. The specific surface area (S1) was determined by converting the value of 2727/SEM minor diameter (nm) with a particle density of silica taken as 2.2.

Particle Density

Colloidal silica was dried and hardened on a hot plate at 150° C. and kept in a furnace at 300° C. for 1 hour. Then, the particle density was measured by a liquid-phase displacement method by using ethanol.

Amine Content

Colloidal silica was centrifuged at 215000 G for 90 minutes, and the supernatant was discarded. The solids were vacuum-dried at 60° C. for 90 minutes. 0.50 g of the obtained dry silica solids were weighed and added to 50 ml of a 1M aqueous sodium hydroxide solution, followed by heating at 50° C. for 24 hours with stirring to dissolve silica. The silica solution was analyzed by ion chromatography to determine the amine content. Ion chromatography analysis was performed in accordance with JIS K0127.

Density of Silanol Groups

The density of silanol groups of silica particles was determined by the Sears method. The Sears method was performed with reference to the following: G. W. Sears, Jr., "Determination of Specific Surface Area of Colloidal Silica by Titration with Sodium Hydroxide," Analytical Chemistry, 28(12), 1981 (1956). The measurement was performed by titration with a 0.1 mol/L aqueous sodium hydroxide solution by using a 1 wt % silica dispersion, and the density of silanol groups was calculated in accordance with the following formula.

$$\rho = (a \times f \times 6022)/(c \times S)$$

In the formula, $\rho$ represents the density of silanol groups (the number of silanol groups, $nm^2$), a represents the amount of droplets of the 0.1 mol/L aqueous sodium hydroxide solution with a pH of 4 to 9 (mL), f represents the factor of a 0.1 mol/L aqueous sodium hydroxide solution, c represents the mass of silica particles (g), and S represents the BET specific surface area ($m^2/g$)

Content of Metallic Impurities

The content of metallic impurities was measured with an atomic absorption spectrometer. The sum of the amounts of sodium, potassium, iron, aluminum, calcium, magnesium, titanium, nickel, chromium, copper, zinc, lead, silver, manganese, and cobalt contained in the colloidal silica was defined as the content of metallic impurities.

TABLE 1

|  | Ex. 1 | Ex. 2 | Comp. Ex. 1 | Comp. Ex. 2 |
| --- | --- | --- | --- | --- |
| Content of alkoxy groups (ppm) | 18109 | 7281 | 10569 | 8692 |
| Average primary particle size (nm) | 28.0 | 26.8 | 22.1 | 28.7 |
| Reduction in specific surface area (%) | 8.1 | 14.3 | 2.9 | 15.2 |
| Alkaline catalyst | 3-EOPA | 3-EOPA | 3-EOPA | TEA |
| s3/c3 | 250 | 250 | 100 | 403 |
| (the amount of alkoxysilane added s3 (mol) in step 3/the amount of alkaline catalyst added c3 (mol) in step 3) |  |  |  |  |
| s2/c1 | 240 | 160 | 1376 | 509 |
| (the amount of alkoxysilane added s2 (mol) in step 2/the amount of alkaline catalyst added c1 (mol) in step 2) |  |  |  |  |
| SEM minor diameter (nm) | 39 | 42 | 22 | 45 |
| Aspect ratio | 1.2 | 1.3 | 1.4 | 1.3 |
| Surface roughness | 1.4 | 1.6 | 1.0 | 1.6 |
| Particle density | 2.11 | 2.11 | 2.15 | 2.07 |
| Amine content (µmol/g) | 58.2 | 58.2 | 54.3 | *1 |
| Average secondary particle size (nm) | 44.6 | 52.8 | 38.6 | 50.9 |
| Aggregation ratio | 1.6 | 2.0 | 1.7 | 1.8 |
| (average secondary particle size/average primary particle size) |  |  |  |  |
| Density of silanol groups (number of groups/nm$^2$) | 2.5 | 2.6 | 1.7 | 3.5 |
| Content of silica parties having a bumpy surface (%) | 91 | 100 | 0 | 79 |
| Content of metallic impurities (ppm) | 0.02 | 0.1 | 0.03 | 0.1 |

*1: In Comparative Example 2, in which amines selected from the group consisting of a primary amine, a secondary amine, and a tertiary amine (wherein the amine contained no hydroxyl group as a substituent) were not used, no amines were detected.

The invention claimed is:

1. A colloidal silica comprising silica particles having a bumpy surface, wherein
   (1) the silica particles have a content of alkoxy groups of 1000 ppm or more,
   (2) the silica particles have a reduction in specific surface area of 15.0% or less when the silica particles are heated under basic conditions, and
   (3) the silica particles have the bumpy surface in an amount of 20% or more of the number of particles in a given field of view as observed with a scanning electron microscope at 200,000-times magnification.

2. The colloidal silica according to claim 1, wherein the silica particles have a particle density of 1.95 or more.

3. The colloidal silica according to claim 1, wherein the silica particles contain 5 µmol or more of at least one amine selected from the group consisting of a primary amine, a secondary amine, and a tertiary amine, per gram of the silica particles, wherein the amine contains no hydroxyl group as a substituent.

4. A method for producing colloidal silica containing silica particles having a bumpy surface, the method comprising in series
   (1) step 1 of preparing a mother liquor containing an alkaline catalyst and water,
   (2) step 2 of adding an alkoxysilane to the mother liquor to prepare a seed particle dispersion, and
   (3) step 3 of adding water, an alkaline catalyst, and an alkoxysilane to the seed particle dispersion,
   wherein the alkaline catalyst is at least one amine selected from the group consisting of a primary amine, a secondary amine, and a tertiary amine, wherein the amine contains no hydroxyl group as a substituent,
   in step 3, the molar ratio (s3/c3) of the amount of the alkoxysilane added s3 (mol) to the amount of the alkaline catalyst added c3 (mol) is more than 185 and 400 or less, and
   the silica particles have the bumpy surface in an amount of 20% or more of the number of particles in a given field of view as observed with a scanning electron microscope at 200,000-times magnification.

* * * * *